Oct. 12, 1937.                 B. LERVOLD                    2,095,608
                                SICKLE
                         Filed Dec. 30, 1935         3 Sheets—Sheet 1

Inventor
Ben Lervold

By Clarence A. O'Brien and
Hyman Berman
Attorneys

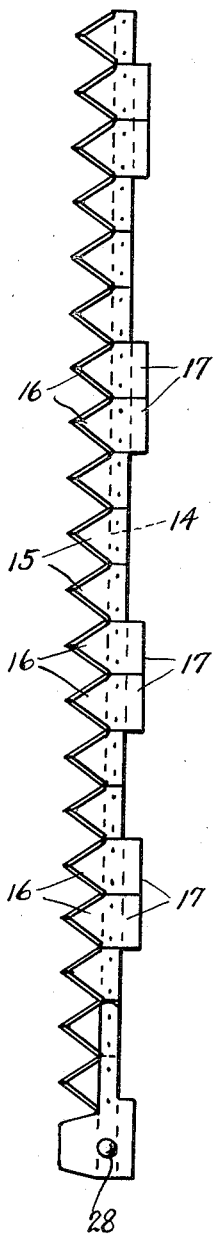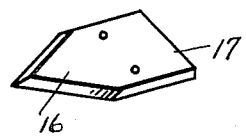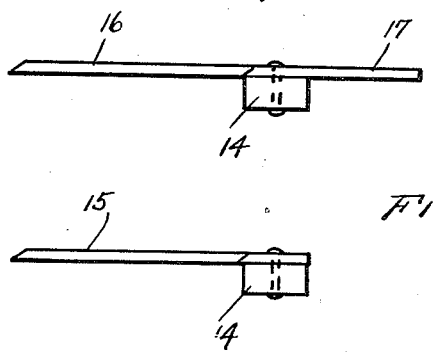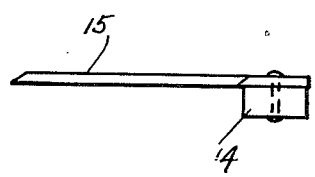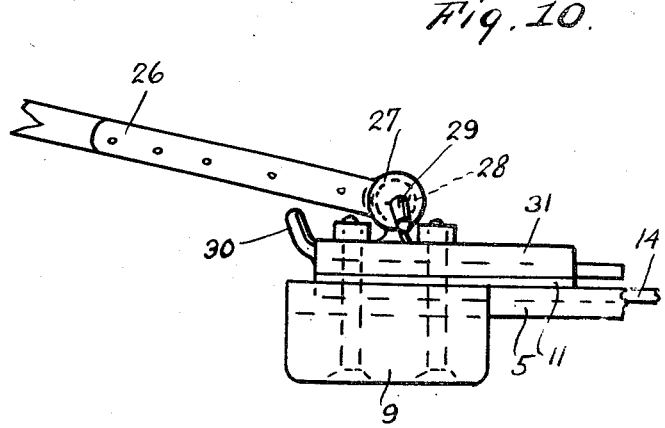

Oct. 12, 1937.　　　　B. LERVOLD　　　　2,095,608
SICKLE
Filed Dec. 30, 1935　　　　3 Sheets-Sheet 3

Inventor
Ben Lervold

By Clarence A. O'Brien and
Hyman Berman
Attorneys

Patented Oct. 12, 1937

2,095,608

UNITED STATES PATENT OFFICE 2,095,608

SICKLE

Ben Lervold, Scandia, Kans.

Application December 30, 1935, Serial No. 56,816

2 Claims. (Cl. 56—298)

This invention appertains to new and useful improvements in farm machinery and more particularly to an improved sickle.

The principal object of the present invention is to provide a sickle construction which will be less susceptible to the development of defects than the types of sickles now on the market.

Another important object of the invention is to provide a sickle construction wherein the parts coact in such a manner as to reduce wear and the requirement for frequent replacement of parts.

Another important object of the invention is to provide a sickle wherein the sickle bar cannot become displaced when the sickle proper is elevated to an inoperative position.

These and various other important objects and advantages of the invention will become apparent to the reader of the following specification.

In the drawings:

Figure 6 is a top plan view of the sickle bar.

Figure 7 is a perspective view of one of the elongated cutting blades.

Figure 8 is a side elevational view of the type of blade shown in Figure 7 attached to the connecting bar.

Figure 9 represents a side elevational view showing one of the regular blades attached to the connecting bar.

Figure 10 is a fragmentary side elevational view of one end portion of the sickle.

Figure 1:
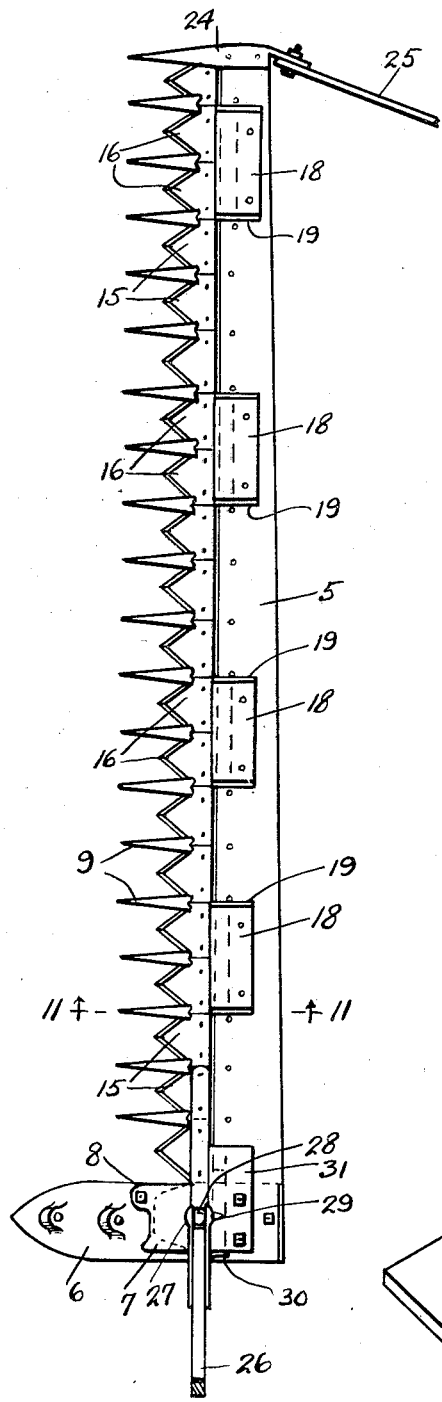
Figure 1 represents a top plan view of the sickle.
Figure 2:
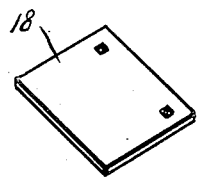
Figure 2 represents a perspective view of one of the cap plates.
Figure 3:
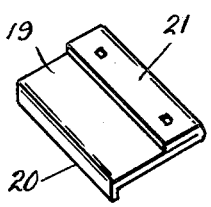
Figure 3 represents a perspective view of one of the wear plates.
Figure 4:
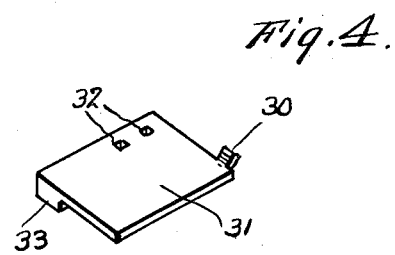
Figure 4 represents a perspective view of another form of cap plate.
Figure 5:
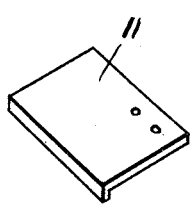
Figure 5 represents a perspective view of another form of wear plate.

Referring to the drawings wherein like numerals designate like parts, it can be seen that numeral 5 represents the elongated bar to one end of which is bolted the tapered casting 6 upon which the wear plate 7 is secured as at 8.

Figure 11:
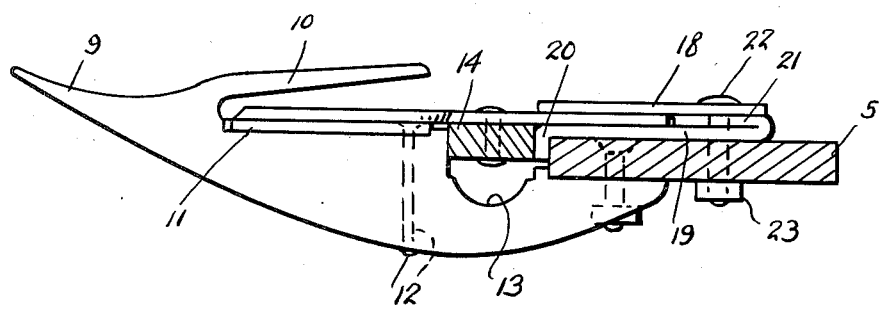
Figure 11 is a sectional view taken substantially on line 11—11 of Figure 1.

As shown in Figure 11, the tapered guards 9 are secured to the bar 5 so as to project forwardly, these guards 9 being provided with the usual backwardly disposed protective fingers 10 under which are located the wear plates 11, secured in place by bolts or rivets 12.

Between the bar 5 and the wear plates 11, the guards 9 are provided with cutaway portions 13 in which the connecting bar 14 is slidable. To this connecting bar 14 is attached the multiplicity of tapering sickle blades 15 and also elongated sickle blades 16, these being elongated by reason of the provision of extensions 17 which are operative between the wear plates 18 and the wear plates 19, so that the bar 14 and its blades are steadied and wear takes place more uniformly, these wear plates 18—19 being secured together as shown in Figure 11. The wear plates 19 are disposed on the bar 5 with their downturned flanges 20 engaging over the inner edge of the bar 5. One end of each of these wear plates 19 extends backwardly upon itself to provide a spacer 21. One end of the wear plate 18 rests upon this spacer 21 and bolts 22 are disposed through the wear plates 18 and 19 and the spacer 21, and also through the bar 5. These bolts 22 are provided with nuts 23 whereby these elements can be secured in the proper relation so that the projecting portions 17 of the blade 16 will be properly guided and stabilized between the wear plates 18—19.

One end of the bar 5 is provided with the end tooth or guide 24 and from this extends the usual brace element 25.

Figure 12:
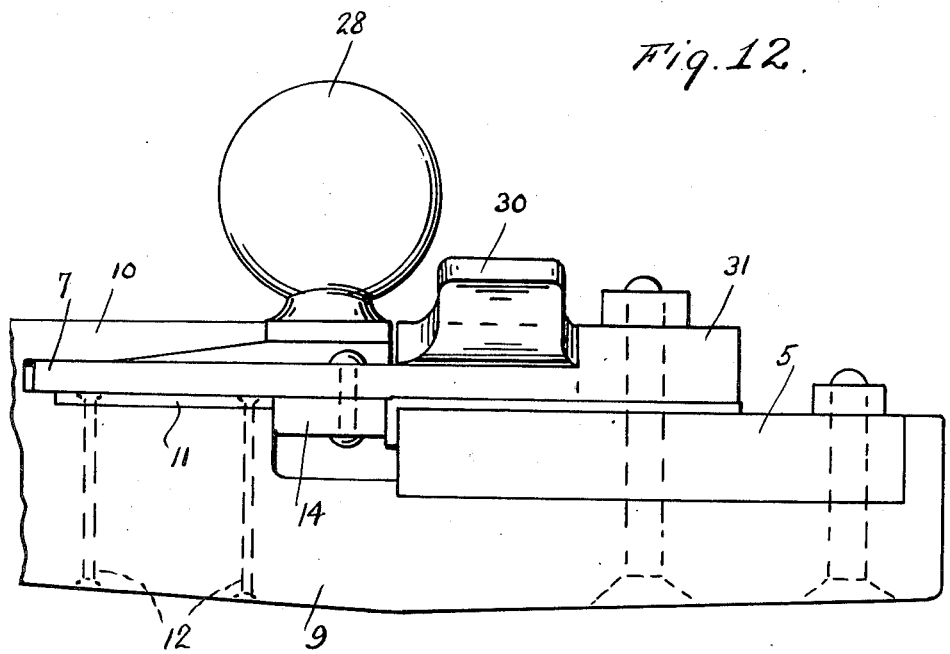
Figure 12 is a fragmentary end elevational view of the sickle.

As shown in Figures 1, 10, and 12, numeral 26 represents the pitman which is provided with a socket structure 27 at its sickle attaching end which engages over the ball head 28 on the drive end of the connecting bar 14. This socket 27 is provided with a laterally disposed lug 29 cooperative with the lug 30 on the cap plate 31 to limit movement of the bar 14 which cap plate is provided with openings 32 whereby it can be secured to the bar 5 and also a shoulder or rib 33 to prevent any twisting or displacement of the same with respect to the connecting bar 14.

Obviously, the sickle described above cannot be removed from a mower until the pitman shaft is disconnected from the sickle, in view of the presence of the lugs 29 and 30.

With the tail portions 17 operating between the plates 18 and 19, the bar 14 and blades thereof are prevented from wobbling transversely and the wear on these blades and parts against which they contact will be distributed over a greater surface so as to substantially increase the duration of wear of these blades.

While the foregoing specification sets forth the invention in specific terms, it is to be understood that numerous changes in the shape, size and materials may be resorted to without departing from the spirit and scope of the invention as claimed hereinafter.

Having thus described the invention, what is claimed as new is:

1. In a sickle bar construction, a plurality of guard members, a reciprocatory bar, said guard members being provided with reduced intermediate portions through which the said bar is reciprocatorily disposed, cutting blades secured to the bar and having their cutting edges projecting over the guard members beyond one side of the reciprocatory bar, guide means on certain of the said guard members, certain of the said blades being provided with extensions for disposition in the guide means to prevent transverse wobbling of the reciprocatory bar and cutting blades.

2. In a sickle bar construction, a plurality of guard members, a reciprocatory bar, said guard members being provided with reduced intermediate portions through which the said bar is reciprocatorily disposed, cutting blades secured to the bar and having their cutting edges projecting over the guard members beyond one side of the reciprocatory bar, guide means on certain of the said guard members, certain of the said blades being provided with extensions for disposition in the guide means to prevent transverse wobbling of the reciprocatory bar and cutting blades, said guide means consisting of a bar bridging the ends of the guard members at the opposite side of the reciprocatory bar on the side beyond which the cutting edges of the blades project, said bridging bar being secured to the guard members, and a pair of plates secured upon the bridging bar with portions thereof in spaced relation to define a slideway for the extending portions of the certain mentioned blades.

BEN LERVOLD.